April 18, 1967  F. F. FRULLA ETAL  3,314,985
RECOVERY OF THE MONODIETHYLENE GLYCOL ESTER
OF p-FLUOROPHENOXYACETIC ACID FROM A
MIXTURE CONTAINING DIETHYLENE GLYCOL
Filed June 13, 1958
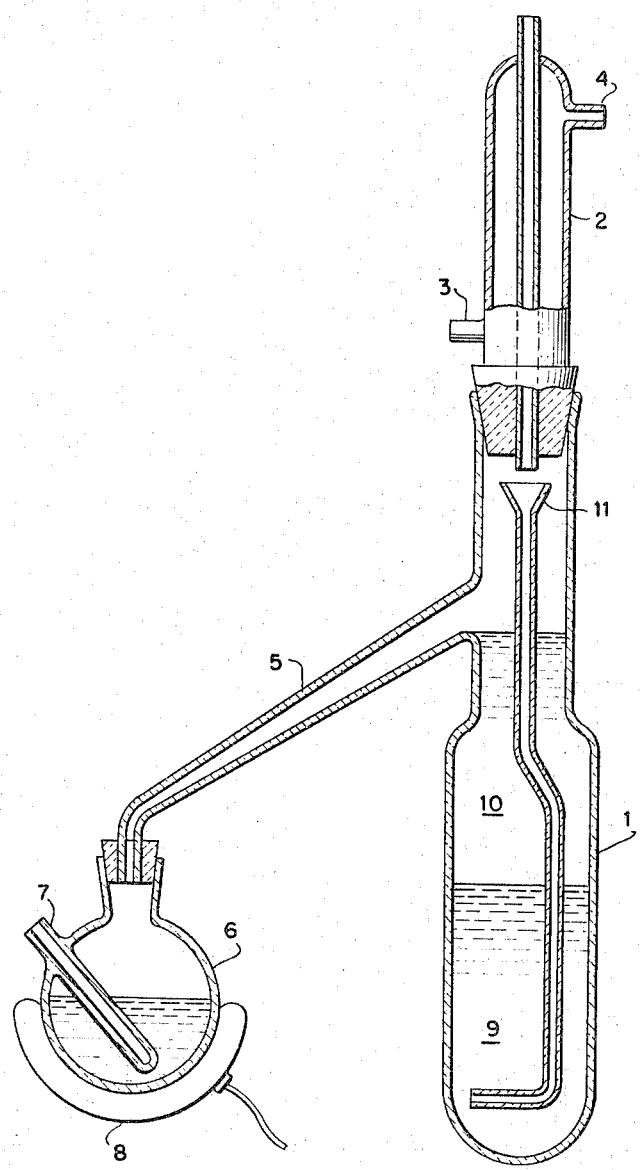
INVENTORS
Max M. Boudakian
BY Floro F. Frulla
Adams Forward and McLean
ATTORNEYS United States Patent Office 3,314,985
Patented Apr. 18, 1967

3,314,985
RECOVERY OF THE MONODIETHYLENE GLYCOL ESTER OF p-FLUOROPHENOXYACETIC ACID FROM A MIXTURE CONTAINING DIETHYLENE GLYCOL
Floro F. Frulla and Max M. Boudakian, Niagara Falls, N.Y., assignors to Olin Mathieson Chemical Corporation, a corporation of Virginia
Filed June 13, 1958, Ser. No. 741,971
2 Claims. (Cl. 260—473)

This invention relates to a method for the recovery of the monodiethylene glycol ester of p-fluorophenoxyacetic acid ($p\text{-}FC_6H_4OCH_2COOC_2H_4OC_2H_4OH$).

The monodiethylene glycol ester of p-fluorophenoxyacetic acid is a useful weed killer, as described in U.S. Patent No. 2,390,941 to Jones. The monoester can be prepared by reacting p-fluorophenoxyacetic acid with diethylene glycol, preferably in the presence of an esterification catalyst. The reaction is also preferably carried out while the reactants are in admixture with refluxing benzene which serves the purpose of maintaining the reaction temperature at the proper level and also serves to remove water of esterification from the reaction mixture in order to aid the reaction in going to completion. In order that the monodiethylene glycol ester will be prepared in preference to the di-diethylene glycol ester ($p\text{-}FC_6H_4OCH_2COOC_2H_4)_2O$), it is advisable that the reaction mixture contain a substantial stoichiometric excess of diethylene glycol, and as a result of this the reaction mixture remaining after the esterification procedure has been carried out will contain a large amount of diethylene glycol as well as the desired mono-ester. Simple distillation, even under a vacuum, is not a satisfactory method for separating the mono-ester from the excess diethylene glycol, since high temperatures must be employed and the use of high temperatures causes undue decomposition of the mono-ester.

In accordance with the present invention there has been devised a highly satisfactory method for the separation of the monodiethylene glycol ester of p-fluorophenoxyacetic acid from a mixture which contains that material and which also contains diethylene glycol. Such a mixture can be an esterification reaction mixture resulting from the esterification of p-fluorophenoxyacetic acid and diethylene glycol and will generally consist essentially of from 10 percent to 30 percent by weight of the monodiethylene glycol ester of p-fluorophenoxyacetic acid, from 90 percent to 70 percent by weight of diethylene glycol, from 0 percent to 5 percent by weight of water, from 0 percent to 10 percent by weight of the di-diethylene glycol ester of p-fluorophenoxyacetic acid, from 0 percent to 5 percent by weight of p-fluorophenoxyacetic acid and from 0 percent to 20 percent by weight of benzene. The percentages stated in the preceding sentence are based upon the combined weight of the monoester and the diethylene glycol.

In the separation procedure of the present invention whereby the mono-ester is separated, the mixture containing the mono-ester and diethylene glycol is extracted with a mixture of water and benzene. After the extraction has been carried out, the entire mixture is permitted to settle, whereby an aqueous phase and a hydrocarbon phase are formed. It is found that the hydrocarbon phase preferentially dissolves the mono-ester, so that the mono-ester can be recovered therefrom in purified form by distilling off the benzene which has been used as the hydrocarbon in the extraction procedure. The extraction can conveniently be carried out at room temperature, but higher and lower extraction temperatures can also be utilized, say from 10° C. to 100° C. If desired, even somewhat lower and somewhat higher extraction temperatures can be employed. The amount of water used will generally be within the range from 50 percent to 200 percent by weight of the crude mixture which contains the mono-ester and diethylene glycol, although here again somewhat smaller and somewhat larger amounts are useful. Likewise, the weight of benzene can be varied widely, generally being from 50 percent to 200 percent of the combined weight of the mixture containing the mono-ester and the diethylene glycol and the water, although this range is not critical, somewhat larger and somewhat smaller amounts of the benzene, also being useful. It is preferred that the water used in the extraction contain sodium bicarbonate dissolved therein for the purpose of neutralizing any free acid which is present in the mixture containing the mono-ester and the diethylene glycol.

The following examples illustrate the invention, but are not to be considered as limiting.

*Example I*

A mixture of 85 grams of p-fluorophenoxyacetic acid, 530 grams of diethylene glycol, 64 grams of benzene and 1.8 grams of 94 weight percent sulfuric acid was refluxed with removal of water of esterification from the reaction mixture until the acidity of the reaction mixture became substantially constant. This procedure required about one hour, and after it was done the benzene was removed from the reaction mixture by vacuum distillation. This procedure yielded an esterification mixture containing 20.2 percent by weight of the mono-diethylene glycol ester of p-fluorophenoxyacetic acid and 0.81 percent by weight of unconverted p-fluorophenoxyacetic acid, the remainder being essentially unconverted diethylene glycol.

247.1 grams of the esterification mixture was extracted by agitating it in a separatory funnel at room temperature for 15 minutes with 297 ml. of water saturated with sodium bicarbonate and 544 grams of benzene. After this had been done, the system undergoing extraction was permitted to stand, forming 609 grams of a benzene layer containing 47.5 grams of the mono-diethylene glycol ester of p-fluoroacetic acid and 479 grams of a water layer containing 6.8 grams of the mono-ester. The benzene layer was separated from the water layer and the water layer was then extracted with 471 grams of benzene in a similar manner. This step yielded 476 grams of a benzene layer containing 4.3 grams of the mono-ester and 466 grams of water layer containing 1.4 grams of the mono-ester. 98.4 percent by weight of the mono-diethylene glycol ester of p-fluorophenoxyacetic acid present in the esterification mixture extracted was present in the combined benzene layers. The combined benzene layers were distilled under vacuum to remove benzene, leaving substantially pure mono-diethylene glycol ester of p-fluorophenoxyacetic acid as a distillation residue.

Table I sets forth pertinent information with respect to Example I as well as with respect to Examples II, III and IV, which were conducted in a similar manner. In Example II the esterification mixture contained 20.6 percent by weight of the mono-ester and 0.44 percent by weight of unconverted p-fluorophenoxyacetic acid, the remainder being essentially diethylene glycol. In Example III, the esterification mixture contained 28.7 percent by weight of the mono-ester, 2.16 percent by weight of unconverted p-fluorophenoxyacetic acid, and 2.18 percent by weight of water, the remainder being essentially diethylene glycol. In Example IV, the esterification mixture had the same compositions it did in Example I.

TABLE I

| Example | Esterification Mixture Wt. (g.) | Saturated NaHCO₃ Sol'n Added Vol. (ml.) | Benzene Added Wt. (g.) | Aqueous Layer | | Benzene Layer | | Total Percent Ester Recovery |
|---|---|---|---|---|---|---|---|---|
| | | | | Total Wt. (g.) | Ester Wt. (g.) | Total Wt. (g.) | Ester Wt. (g.) | |
| I | 247.1 | 297 | 544 | 479 | 6.8 | 609 | 47.5 | 98.4 |
| | | | 471 | 466 | 1.4 | 476 | 4.3 | |
| II | 351.4 | 429 | 779 | 689 | 7.6 | 854 | 60.6 | 97.2 |
| | | | 678 | 650 | 2.0 | 653 | 5.4 | |
| III | 265 | 185 | 450 | 281 | 4.7 | 530 | 66.2 | 100 |
| | | | 458 | 263 | 0.0 | 456 | 3.7 | |
| IV | 250 | 302 | 552 | 486 | 8.3 | 618 | 52.6 | 94.5 |
| | | | 314 | 472 | 2.4 | 314 | 5.0 | |

*Example V*

Following the general procedure described in Example I, 170 grams of para-fluorophenoxyacetic acid and 1061 grams of diethylene glycol were esterified while in admixture with 65 grams of benzene and 60 grams of a commercially available sulfonated organic coal derivative containing both sulfonic acid and carboxylic acid groups to produce a reaction mixture which contained 19.9 percent by weight of the monodiethylene glycol ester of p-fluorophenoxyacetic acid and 0.91 percent by weight of para-fluorophenoxyacetic acid, the remainder being essentially diethylene glycol.

Using apparatus shown in the accompanying drawing, 101.5 grams of this esterification mixture was continuously extracted with 120 ml. of water and 350 ml. of benzene for a period of 28.65 hours. The apparatus consisted of a flask 1 connected to a reflux condenser 2 which was cooled by means of water introduced into line 3 and removed by means of line 4. A side-arm 5 from the flask 1 was connected to a second flask 6 which was equipped with a thermowell 7 and which was heated by means of heating mantle 8. The numeral 9 represents the esterification mixture and the added water and the numeral 10 represents a layer of benzene. In operating the apparatus, benzene was vaporized from flask 6 and the vapors flowed through side-arm 5 and were condensed in reflux condenser 2. The benzene vapors condensed, dropped down through funnel 11 and contacted the esterification mixture and added water 9. After contacting the esterification mixture and added water 9, the benzene rose into benzene layer 10, the overflow from which passed through side-arm 5 and back into the second flask 6. By operating the apparatus in this manner, the esterification mixture and added water layer 9 was continuously extracted with fresh quantities of liquid benzene.

During the extraction, esterification mixture and added water 9 was at a temperature of approximately 80° C. and the amount of benzene passing down through funnel 11 was approximately one liter per hour. At the end of the experiment, 20.63 grams of the monoester were present in the benzene containing flask 6 and 0.24 gram remained in the waterlayer 9, representing 98.8 percent recovery of the mono-ester in the benzene layer. The mono-ester can be recovered from the benzene layer in essentially pure form by distilling off the benzene under vacuum.

Information concerning Example V, as well as Examples VI through XIV, which were performed in a similar manner is set forth in Table II. In performing the experiments set forth in Table II, the apparatus employed was of appropriate size as determined by the amounts of esterification mixture, water (pure or containing sodium bicarbonate) and benzene used. In Examples VII, VIII, IX and X the esterification mixture extracted with the aqueous sodium bicarbonate and benzene was of the same composition as that of Example V. In Examples VI, XI, XII and XIV, the esterification mixtures contained, respectively, 19.8, 20.0, 20.3, 21.0 and 21.3 percent by weight of the mono-ester and 0.93, 0.81, 0.66, 0.47 and 0.69 percent by weight of p-fluorophenoxyacetic acid.

TABLE II

| Example | Esterification Mixture Wt. (g.) | Water Added Vol. (ml.) | Conc. NaHCO₃ in Water, Wt. Percent | Benzene Added Volume (ml.) | Extraction Time (hr.) | Ester in H₂O, Wt. (g.) | Ester in C₆H₆ Extract, Wt. (g.) | Percent Ester Recovered |
|---|---|---|---|---|---|---|---|---|
| V | 101.5 | 120 | 0.0 | 350 | 28.65 | 0.24 | 20.63 | 98.8 |
| VI | 203.4 | 203 | 0.50 | 900 | 90.00 | 0.70 | 37.98 | 98.2 |
| VII | 111.4 | 133 | 0.72 | 375 | 46.50 | 0.0 | 21.25 | 100.0 |
| VIII | 348.3 | 420 | 0.75 | ¹510 | 28.65 | 1.02 | 64.77 | 98.4 |
| IX | 137.2 | 138 | 0.73 | 350 | 88.78 | 1.21 | 27.65 | 96.0 |
| X | 288.8 | 289 | 0.73 | 700 | 88.78 | 1.05 | 55.96 | 98.2 |
| XI | 358.4 | 430 | 0.80 | 700 | 67.90 | 2.15 | 70.00 | 97.3 |
| XII | 338.6 | 405 | 0.81 | 600 | 51.83 | 0.65 | 68.16 | 99.2 |
| XIII | 768.5 | 925 | 0.60 | 1,500 | 23.87 | 4.58 | 156.5 | 96.5 |
| XIV | 818.5 | 983 | 0.60 | 1,500 | 41.93 | 6.45 | 167.5 | 96.8 |

¹ After 24 hours the temperature had risen to 110° C.; 50 ml. of benzene was then added and the temperature dropped to 102° C.

It is claimed:

1. In the recovery of the monodiethylene glycol ester of p-fluorophenoxyacetic acid from a mixture which consists essentially of from 10 percent to 30 percent by weight of the said ester, from 90 percent to 70 percent by weight of diethylene glycol, from 0 percent to 5 percent by weight of water, from 0 percent to 10 percent by weight of the di-diethylene glycol ester of p-fluorophenoxyacetic acid, from 0 percent to 5 percent by weight of p-fluorophenoxyacetic acid, and from 0 percent to 20 percent by weight of benzene, the aforestated percentages being based upon the combined weight of the monodiethylene glycol ester of p-fluorophenoxyacetic acid and the diethylene glycol, the steps of extracting said mixture with benzene and water and forming a benzene phase and a water phase, and recovering the monodiethylene glycol ester of p-fluorophenoxyacetic acid from the benzene phase.

2. The method of claim 1 wherein said extraction is performed at a temperature within the range from 10° C. to 100° C., wherein said mixture is extracted with water in the amount of from 50 percent to 200 percent by weight, based upon the weight of said mixture, and wherein said mixture is extracted with benzene in the amount of from 50 to 200 percent by weight, based upon the weight of said mixture and water.

No references cited.

LORRAINE A. WEINBERGER, *Primary Examiner.*

L. D. ROSDOL, *Examiner.*

W. I. ANDRESS, S. B. WILLIAMS,
*Assistant Examiners.*